United States Patent [19]
Brown et al.

[11] B  3,982,063
[45] Sept. 21, 1976

[54] METHODS AND APPARATUS FOR REDUCING THE BANDWIDTH OF A VIDEO SIGNAL

[75] Inventors: Earl Franklin Brown, Piscataway; Robert Lewis Eilenberger, Colts Neck; Alan Mayer Gordon; Pat Le Mar Gordon, both of Matawan; John Ormond Limb, New Shrewsbury, all of N.J.

[73] Assignee: Bell Telephone Laboratories, Incorporated, Murray Hill, N.J.

[22] Filed: Feb. 3, 1975

[21] Appl. No.: 546,426

[44] Published under the second Trial Voluntary Protest Program on January 27, 1976 as document No. B 546,426.

[52] U.S. Cl. .................................. 178/6; 178/5.6; 178/5.8 R; 178/DIG. 3; 178/DIG. 23; 179/2 TV
[51] Int. Cl.² .................. H04N 5/46; H04N 7/18
[58] Field of Search ............... 178/6, DIG. 3, 5.6 R, 178/5.8 R, DIG. 23; 179/2 TV

[56] References Cited
UNITED STATES PATENTS
3,806,644  4/1974  Browne et al. .................... 178/6.8

OTHER PUBLICATIONS
M. C. W. van Buul & L. J. van de Polder, "Standards Conversion of a T.V. Signal", Philips Research Reports, Vol. 28, 8-73, pp. 377-390.

*Primary Examiner*—Robert L. Griffin
*Assistant Examiner*—Edward L. Coles
*Attorney, Agent, or Firm*—Bryan W. Sheffield

[57] ABSTRACT

Alternate lines of a 526 line video signal are time-stretched and transmitted over a transmission channel of limited bandwidth. At the receiver, the lines are compressed back to their original duration and displayed in an interlaced manner on a conventional receiver by blanking alternate lines in each field. In another embodiment of the invention, adjacent transmitted lines of the video signal are averaged at the receiver and the resultant signals are substituted for the non-transmitted lines of the video signal.

9 Claims, 7 Drawing Figures

METHODS AND APPARATUS FOR REDUCING THE BANDWIDTH OF A VIDEO SIGNAL

BACKGROUND OF THE INVENTION

1. Field of the Invention

Broadly speaking, this invention relates to television systems and the like. More particularly, in a preferred embodiment, this invention relates to methods and apparatus for reducing the bandwidth of a video signal for transmission over a communication facility of limited bandwidth.

2. Description of the Prior Art

One of the major factors to be considered in the design of any switched video telephone system is the overall cost to the subscriber. Because broad-band video channels are expensive it has generally been agreed, both here and in Europe, that transmission facilities having a bandwidth of about 1 MHz represent a reasonable compromise between technical and economic considerations.

Once system bandwidth is determined, attention becomes focused on the standards to be employed by the camera and receiver at the subscriber's location. Logically, one would expect the camera and receiver to have bandwidth requirements approximately the bandwidth of the transmission facility used. Bell System PICTUREPHONE service, for example, employs a 267 line, 30 frames per second scanning standard and produces a video signal of approximately 1.2 MHz bandwidth, which is close to the 1 MHz bandwidth of PICTUREPHONE transmission channels.

Because PICTUREPHONE scanning standards differ from commercial scanning standards, each PICTUREPHONE camera and receiver must be specially manufactured, which adds to the overall cost of providing PICTUREPHONE service. To obviate this, it has been proposed that standard, off-the-shelf television cameras and receivers be modified for use with the PICTUREPHONE system. This would permit the economies of scale which are available to commercial equipment manufacturers to be passed on to the subscriber, for example, by way of reduced rates. Unfortunately, the high definition video signal from a commercial television camera has a bandwidth of approximately 4 MHz and if this broad-band video signal is transmitted over a 1 MHz transmission channel without special processing, the resulting picture, as received at a distant location, is psychologically objectionable to most viewers. This is due to the fact that the vertical resolution of the received picture, which is determined primarily by the number of active scanning lines, will be approximately four times greater than the horizontal resolution, which is determined primarily by the bandwidth of the transmission facility. Thus, some means for approximately equalizing the subjective perception of both horizontal and vertical resolution by the viewer is desirable.

An article by van Buul and van de Polder in *Philips Research Reports*, Volume 28, August 1973, pages 377 – 390, describes a technique for processing a broad-band, 625 line, 25 frames/second, video signal for transmission over a 1 MHz channel for ultimate display on a 313 line, 25 frames/second video telephone.

The technique described by van Buul and van de Polder is straightforward in its approach. Briefly, even-numbered scanning lines are discarded and odd numbered lines are alternately fed to a pair of analogue shift registers which are shifted at a rate corresponding to the horizontal frequency of the incoming 625 line picture. Subsequently, the shift registers are read out at a rate very nearly corresponding to the horizontal frequency of the 313 line picture. This has the effect of stretching every alternate line in the original 625 line picture. The line time stretching, combined with the use of only alternate lines, reduces the bandwidth of the video signal from 5 MHz down to about 1 MHz, thus matching the 1 MHz bandwidth of the transmission facility.

Unfortunately, this relatively unsophisticated approach to bandwidth reduction results in a certain degree of picture degradation. For example, because the original 625 line picture is interlaced 2:1, the scanning lines in alternate fields of the reduced bandwidth, 313 line picture are displaced upwardly from their desired position by an amount which is equal to the distance between adjacent lines in the 625 line picture. This causes any oblique lines which may be present in the scanned scene to take on a serrated appearance and, in addition, generates moire patterns in higher spatial frequencies in the vertical direction. These effects can be minimized by the use of more complicated circuitry including delay lines, but the circuitry then becomes considerably more expensive to manufacture. A somewhat similar scheme is disclosed in U.S. Pat. No. 3,806,644, which issued on Apr. 23, 1974 to P. N. Browne et al and which is assigned to the assignee of the instant invention. Unlike van Buul's and van de Polder's technique, however, Browne et al disclose apparatus for converting a 267 line, 30 frames/second PICTUREPHONE signal for display on a commercial receiver originally intended to display a standard 525 line, 30 frames/second picture. However, the circuitry disclosed by Browne is generally similar to that employed by van Buul and van de Polder.

The problem, then, is to convert the output of a television camera nominally designed to produce a 525 line, 30 frames/second, 2:1 interlaced picture so that it is compatible with a 1 MHz PICTUREPHONE transmission channel and then to display the resultant picture either on a standard PICTUREPHONE Video Telephone (PVT) receiver or, after further processing, on a standard commercial television receiver, all without substantial degradation of the picture with respect to established PICTUREPHONE standards.

SUMMARY OF THE INVENTION

The above problem has been solved by the instant invention which, in an illustrative embodiment, comprises apparatus for reducing the bandwidth of the composite video signal which is generated by a television camera, or the like. In addition to providing the composite video signal, the television camera also supplies a horizontal synchronization signal and a master clock signal. The apparatus includes a first divider circuit, which is used to divide the frequency of the horizontal synchronization signal by a factor of two, and a second divider circuit, connected to the first divider circuit, for dividing the frequency of the first divider's output by a factor of two, the second divider circuit having first and second complementary outputs.

The circuitry also includes a third divider circuit for dividing the master clock signal from the television camera by a factor of N, where N is inversely proportional to the horizontal definition which is desired for the reduced bandwidth video signal, and a fourth divider circuit for dividing the frequency of the output signal from the third divider circuit by a factor of two. Also included in the apparatus is a first switching means, controlled by the output of the first divider circuit, for interrupting the transmission path of the video signal during alternate scanning lines in each field of the video signal, and a first shift register of a capacity which is sufficient to store at least one complete scanning line of the video signal. The apparatus further includes a second switching means, controlled by the first output of the second divider circuit, for alternately connecting the clock pulse input of the first shift register to the output of the third divider circuit or to the output of the fourth divider circuit as well as a second shift register of a capacity sufficient to store at least one complete scanning line of the video signal. Finally, the apparatus includes third switching means, controlled by the second output of the second divider circuit, for alternately connecting the clock pulse input of the second shift register to the output of the fourth divider circuit or to the output of the third divider circuit, a fourth switching means, connected to the output of the first switching means and controlled by the first output of the second divider circuit, for alternately routing the scanning lines of the video signal which are passed by the first switching means to the first or to the second shift register, and a fifth switching means controlled by the second ouput of the second divider stage, for alternately selecting the output of the first and second shift register thereby generating a composite video signal having the reduced bandwidth which is desired.

The invention and its mode of operation will be more fully understood from the following detailed description of the invention, when taken with the drawings, in which:

DETAILED DESCRIPTION OF THE INVENTION

As is well known, the standard employed in the United States for commercial television service calls for 525 scanning lines/frame, 2:1 interlace, and 60 fields/second. Thus, each line is scanned in 63.5 microseconds. Experience with PICTUREPHONE service, however, has shown that about 250 lines/frame is more than adequate for video telephone applications and, in fact, 267 lines/frame was selected for one experimental tariff offering. Now it will be noted that 267 lines is close to the 262½ lines contained in each field of an interlaced 525-line signal. This suggests the possibility of using commercial television cameras to generate the PICTUREPHONE signal.

In general, the number of picture elements (pels) per scanning line is:

pels/line + $2f_c/f_h$ , where
$f_c$ = channel bandwidth and
$f_h$ = horizontal sweep frequency.

Thus, if we select alternate lines in each field of a 525 line picture and stretch the duration of each line from 63.5 μs to 127 μs, we obtain:

pels/line = $2 \times 1 \times 10^6 \times 127 \times 10^{-6}$ = 254.

Since there are 262½ scanning lines in each field, the vertical resolution will be, by definition 262.5 pels. Thus, the overall picture definition will be 262.5 pels × 254 pels. This is subjectively equal to the definition of a standard PICTUREPHONE signal. As will be more fully explained below, this signal may be displayed directly on a conventional PICTUREPHONE receiver and is thus fully compatible with existing PICTUREPHONE installations. Further, if after transmission over a 1 MHz PICTUREPHONE transmission channel, the duration of each scan line is compressed back to 63.5 microseconds, the 262.5 line signal may be displayed on a conventional 525 line receiver but, of course, resolution will be limited to 262.5 × 254 pels. As will also be explained below, with some additional signal processing it is possible to utilize the full 525-line display capability of a conventional receiver, although the horizontal resolution remains limited by the 1 MHz bandwidth of the transmission channel and the vertical resolution is limited to 262.5 lines even though 525 lines are displayed.

Figure 1:
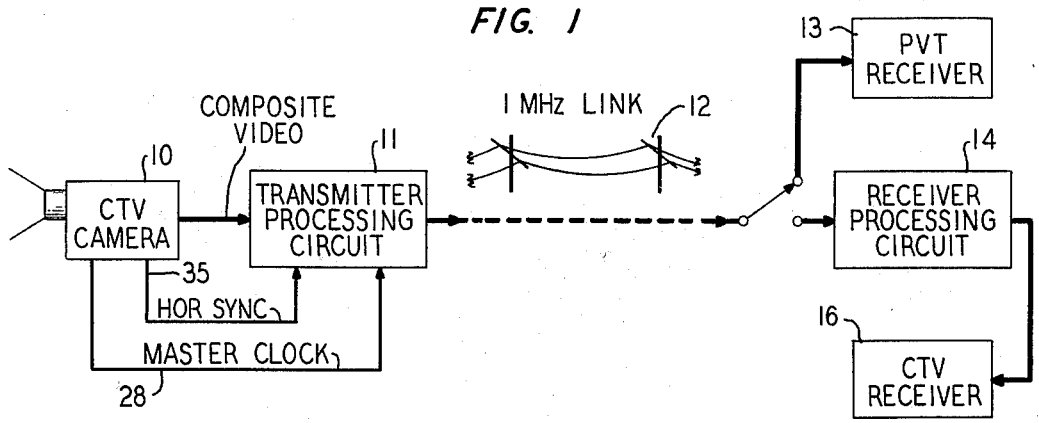
FIG. 1 is a block diagram of a bandwidth reduction system according to the invention.

FIG. 1 depicts an illustrative system for converting the output of a commercial television (CTV) camera into a format which is compatible with transmission over a 1 MHz transmission facility for display on a conventional PICTUREPHONE receiver. The following discussion assumes that the sync generator of the television camera is adjusted so that the camera generates a 2:1 line interlaced 526 line video signal each one-thirtieth of a second, rather than the conventional 525 line signal. This adjustment, the actual mechanics of which are not described in detail here, simplifies the equipment required to convert the video signal into the PICTUREPHONE format because it then becomes unnecessary to make special provisions to handle the one-half line normally present in each field of a 525 line interlaced frame.

As shown in FIG. 1, the 526 line output signal from CTV camera 10 is applied to the input of a transmitter processing circuit 11 which modifies the signal into a format which is suitable for transmission over a 1 MHz bandwidth link 12.

At the receiving end of link 12, the modified video signal can be switched to either a PVT receiver of a known type, for example, a PVT receiver designed to display a 263 line/frame picture, or to a receiver processing circuit 14 which modifies the incoming video signal to permit display of a 263 line per frame, 2:1 line interlaced picture on a CTV monitor or receiver 16 operating with a raster of 263 lines per field where alternate lines are blanked in each field to give the above-mentioned display. In order to simplify the description of the invention, video transmission in only one direction is shown. However, it will be apparent to one skilled in the art that reciprocal transmission could easily be attained by using additional apparatus of identical characteristics of the opposite ends of link 12.

Figure 2:
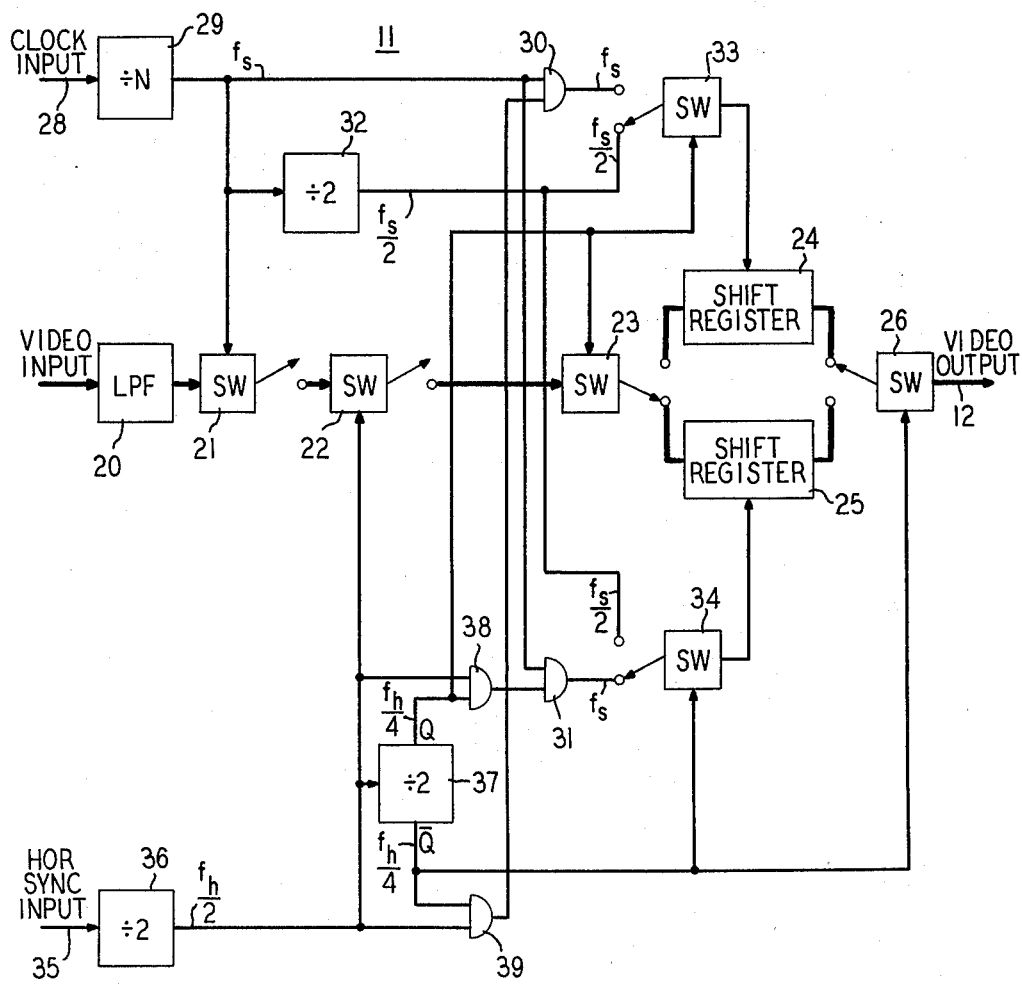
FIG. 2 is a schematic diagram of an illustrative transmitter processing circuit for use in the bandwidth reduction system shown in FIG. 1.

FIG. 2 depicts transmitter processing circuit 11 in greater detail. As shown, the 526 line video signal is applied to the input of a low-pass filter 20 which advantageously has a cutoff frequency of 2 MHz. The output of filter 20 is applied to the input of an electronic sampling switch 21, thence to the input of a second electronic switch 22, thence to the input of a third electronic switch 23. Switches 21, 22 and 23 are shown in a simplified schematic form in the drawing but one skilled in the art will appreciate that these electronic switches, and other similar switches which will be referred to subsequently in the description of the invention, may comprise any known electronic switching arrangement which is capable of operating at the high switching rates found in television circuitry.

The output of switch 23 is connected to the input of either a first analogue shift register 24 or a second analogue shift register 25, depending upon the state of switch 23. A fourth electronic switch 26 similarly connects the output of either shift register 24 or shift register 25 to the 1 MHz transmission link 12 of the PICTUREPHONE network.

The master clock output signal of camera 10, on line 28, is applied to a divide-by-N circuit 29, the division ratio of which is chosen to correspond to the desired number of picture elements (pels) per line. The output of circuit 29 provides the sampling pulse signal $f_s$ which serves to operate switch 21 and, in addition, is connected to one input terminal of each of two, 2-input logical AND-gates 30 and 31. The output of divider circuit 29 is also connected to the input terminal of a divide-by-two circuit 32. The output of circuit 32, represented $fg_s/2$, is connected to one input terminal of each of two, 2-position, single-pole electronic switches 33 and 34. The horizontal synchronization signal $f_h$ from camera 10, on line 35, is applied to the input of a divide-by-two circuit 36, the output of which, $f_h/2$, is connected to the control lead of electronic switch 22, which thus allows alternate lines of sampled video signal to appear at the contactor input terminal of switch 23. In addition, the output signal $f_h/2$ from circuit 36 is applied to one input terminal of each of two, 2-input, logical AND-gates 38 and 39. The output from divider circuit 36 is also applied to the input of a divide-by-two circuit 37 having complementary outputs Q and $\bar{Q}$. The Q output, which is at a frequency $f_h/4$, controls switches 23 and 33 and is also applied to the remaining input terminal of AND-circuit 38. In like manner the $\bar{Q}$ output controls switches 26 and 34 and is also applied to the remaining input terminal of AND-gate 39.

The output of AND-gate 38 is applied to the remaining input terminal of AND-gate 31 and, in like manner, the output from AND-gate 39 is applied to the remaining input terminal of AND-gate 30.

The output from AND-gate 30 is applied to the remaining input terminal of switch 33, while the output signal from the contactor terminal of switch 33 is applied to the clock pulse input terminal of shift register 24. In like manner, the output from AND-gate 31 is applied to the remaining input terminal of switch 34, while the output signal from the contactor terminal of switch 34 is applied to the clock pulse input terminal of shift register 25.

The operation of the circuit shown in FIG. 2 can be more fully explained by reference to FIG. 3 which shows the line and field timing relationships of a 526 line interlaced video signal of the type which may advantageously be processed in the circuitry of FIG. 2.

As shown, electronic switch 21, which operates at the sampling pulse rate $f_s$, alternately opens and closes a path between the output of filter 20 and the input to switch 22. The operation of switch 21 thus provides discrete samples of the video signal at prescribed intervals for ultimate storage in the shift registers 24 and 25. In the illustrative embodiment there will be 254 such discrete samples for each line of video information. The integrating effect of the 1 MHz transmission link ensures that the discrete samples are not visible to the viewer at the distant end. On the other hand, switch 22, which operates at one-half the horizontal frequency $f_h$, alternately opens and closes a path between the output of switch 21 and the input to switch 23. Thus, switch 22 will pass alternate lines 1, 3, 5, 7, . . . of field 1 and alternate lines 265, 267, 269, 271, . . . of field 2 but will block alternate lines 2, 4, 6, 8, etc. of field 1 and alternate lines 264, 266, 268, etc. of field 2.

Electronic switch 23 which is controlled by the Q output of divider 37, itself driven at half the rate of divider 36, feeds alternate lines of video information passed by switch 22 to either shift register 24 or shift register 25. For example, in field 1, scanning lines, 1, 5, 9, . . . 261 will be stored in shift register 24, while scanning lines 3, 7, 11 . . . 263 will be stored in shift register 25.

In like manner, during the second field, shift register 24 will store lines 265, 269, 273 . . . 525, while shift register 25 will store lines 267, 271, 275 . . . 523. It will be apparent from FIG. 2 that while switch 23 is feeding a new line of video signals into shift register 25, switch 26 is feeding the line previously stored in shift register 24 to the 1 MHz transmission channel 12. It will also be apparent that the synchronous operation of oppositely-poled switches 23 and 26, which are driven by the complementary logic signals on the Q and $\bar{Q}$ output terminals of divider 37, will ensure that while switch 23 is feeding a new line into shift register 24, switch 26 feeds the line previously stored in shift register 25 to transmission channel 12.

As previously explained, it is advantageous to select alternate lines of the original video signal and to time-stretch these lines to twice their original duration for transmission over link 12 which is limited in bandwidth to approximately 1 MHz. In the preceding discussion, the sampling of the video signal, the selection of alternate lines, and the alternate routing of alternate lines into and out of a pair of shift registers has been described. The time-stretching process will now be explained in more detail.

Shift registers 24 and 25, which it will be recalled are analogue devices, each have a storage capacity of 254 pels, which corresponds to the number of picture elements in each 63.5 microsecond line of video signals after the video signal has been filtered in low-pass filter 20 and sampled by switch 21. As shown in FIG. 2, switch 34 is commutated to the output of AND-gate 31, which signal comprises an intermittent and recurring train of 254 pulses, $f_s$, the train being 63.5 microseconds in duration and occurring at intervals of $f_h/4$. This, of course, results from the connection of the input of AND-gate 31 to the output of divide-by-N circuit 29 and to the output of AND-gate 38. The inputs of AND-gate 38 are connected, in turn, to the Q output from divide-by-2 circuit 37, which signal can also be described as $f_h/4$, and to the output of divide-by-2 circuit 36 which is described as $f_h/2$.

It will be apparent, therefore, that in a period of 63.5 microseconds, occurring every fourth line time when switch 34 is commutated to the output of AND-gate 31 by the connection of its activation terminal to the Q output of divide-by-2 circuit 37, 254 pels of video information will be read into shift register 25. During and following the above described read-in period of shift register 25, switch 26 is commutated for a period of 127 microseconds to the output of shift register 24 by the connection of its activation terminal a to the Q output of divide-by-2 circuit 37. This dwell period for switch 26 provides the time-stretch interval required for the read-out from the shift register of a 63.5 microsecond line of video signal at half speed. Since switch 23 is activated by a complementary signal of similar duration from the Q output of divide-by-2 circuit 37, it will be apparent that 127 microseconds of dwell time is obtained for each of the two commutation positions of switch 23, although only 63.5 microseconds of each commutation period is necessary for read-in of video information into the shift registers.

The read-out, in 127 microseconds, of the 254 pels contained in shift register 24 occurs because switch 33 is activated by the Q output from divide-by-2 circuit 37 to the commutation position in which the contactor is connected to the $f_s/2$ signal appearing at the output of divide-by-2 circuit 32, thus shifting the video signal out of the register at half the input rate or, stated another way, in twice the time that was required to read it in. It will be apparent from the symmetry of the circuit interconnections shown in FIG. 2 and from the preceding description that a detailed description of the reciprocal operation of the read-in of signals to shift register 24 and the read-out of signals from shift register 25 is not required.

Figure 3:
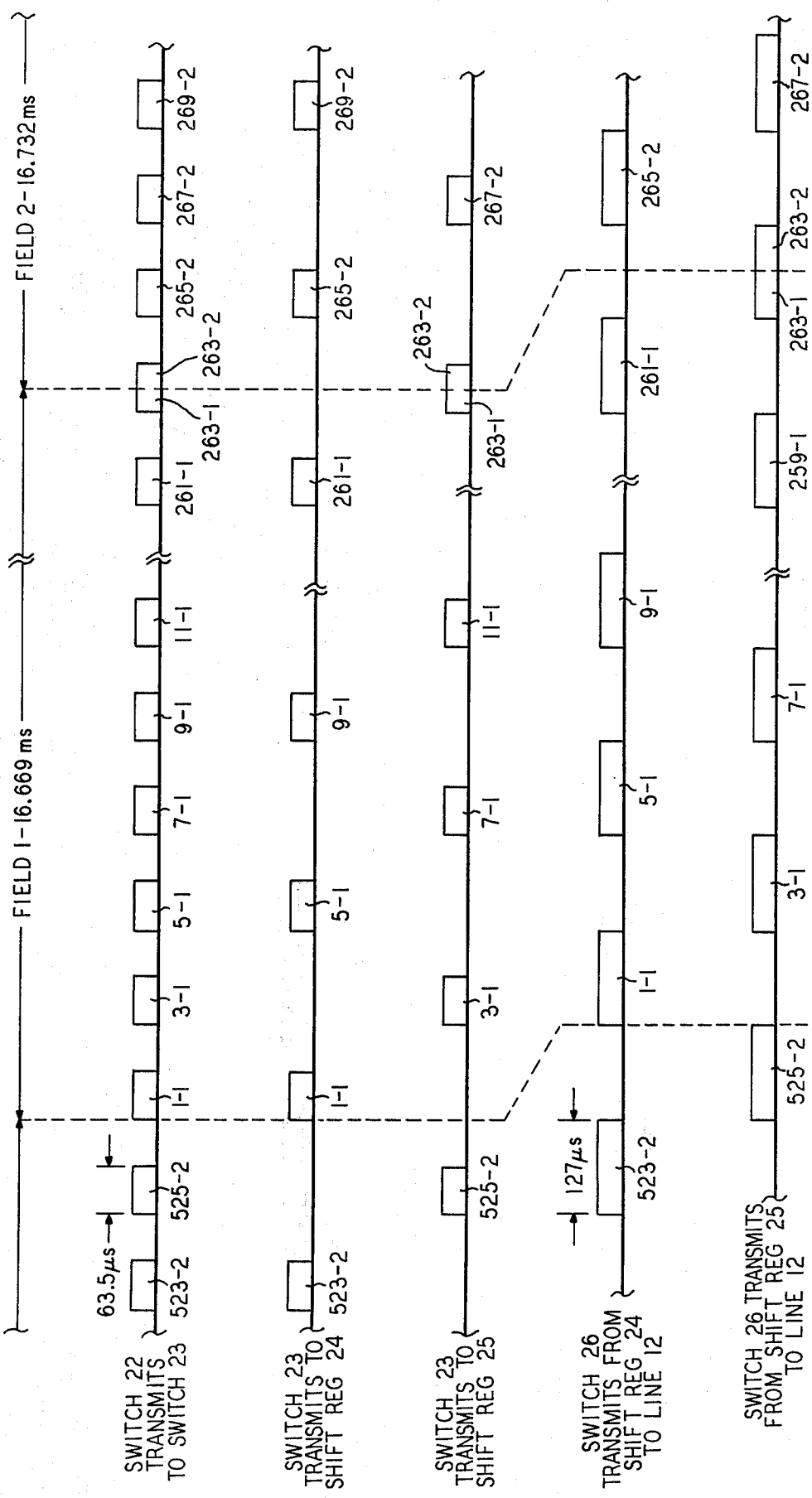
FIG. 3 is a diagram illustrating the operating algorithm for the processing circuit shown in FIG. 2.

As previously mentioned, FIG. 3 is a timing diagram which graphically depicts the signal processing above-described for both interlaced fields in a frame of video information. This timing diagram is believed to be self-explanatory and is not discussed in detail.

As previously discussed, the video signal received at the distant end of link 12 is in a format which may be directly displayed by a standard PVT receiver. However, if the video signal is to be displayed on a CTV receiver or monitor, some additional signal processing is required.

Figure 4:
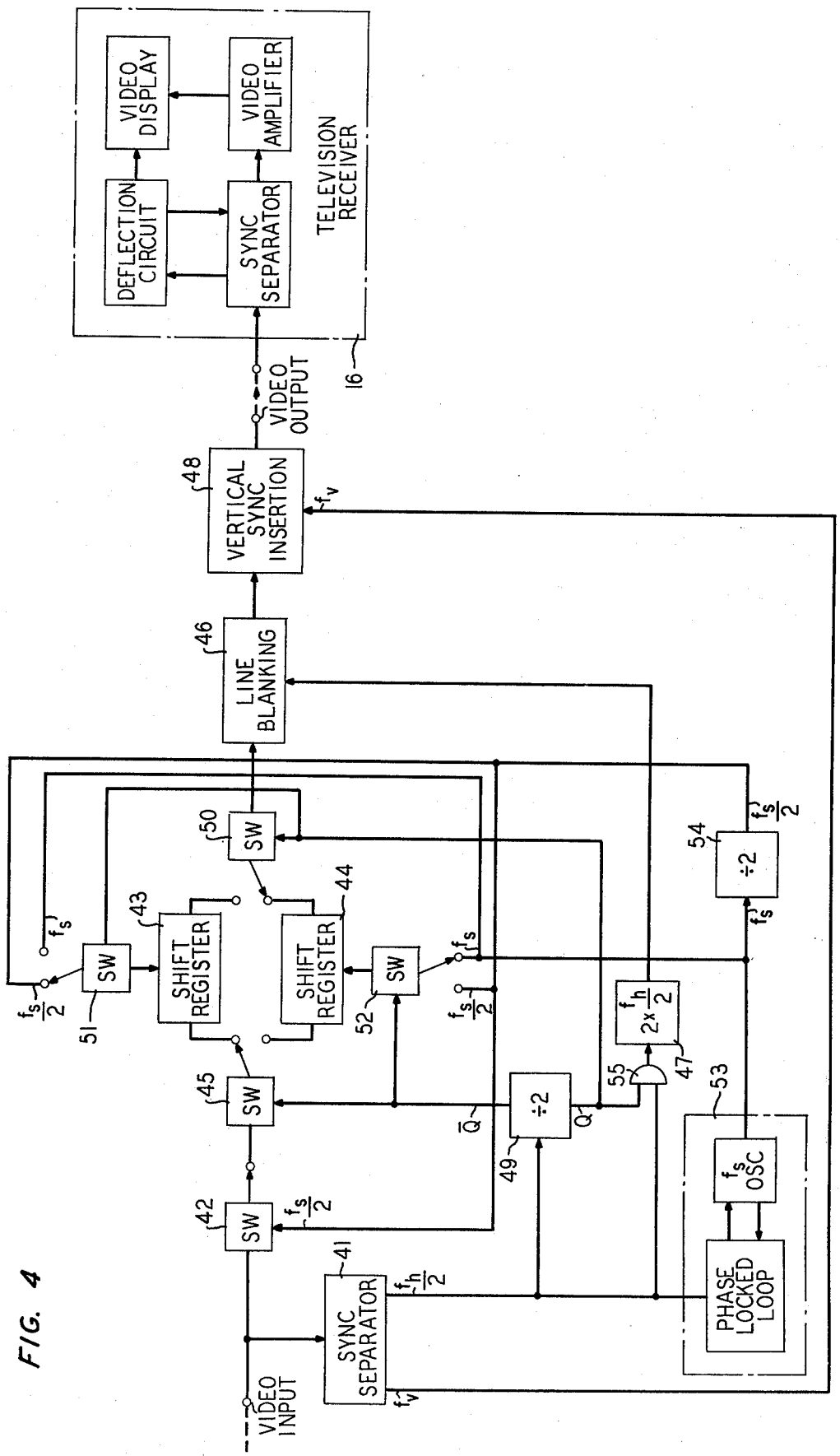
FIG. 4 is a schematic diagram of another embodiment of the invention for processing a reduced bandwidth video signal, such as produced by the circuit shown in FIG. 2, so that it may be displayed on a conventional television receiver.

To that end, FIG. 4 depicts the circuitry which is required at the receiving location to compress the scan lines from 127 $\mu$s to 63.5 $\mu$s so that the 263 line signal can be displayed on conventional CTV receiver 16. As shown, the video signal from the PICTUREPHONE channel is applied to the input of a sync separator 41 and to the input of an electronic sampling switch 42, thence to the input of an electronic switch 45, thence to the input of an electronic switch 45. In a well known manner, sync separator 41 recovers the vertical sync signal $f_v$ and the horizontal sync signal $f_h/2$ from the incoming composite video signal. The output of switch 45 is connected to either a first shift register 43 or a second shift register 44 in a manner which is analogous to the transmitter processing circuit discussed above with reference to FIG. 2. An electronic switch 50 connects the output of either shift register 44 or shift register 43 to a line blanking circuit 46 which receives a blanking control signal from a multiplying circuit 47. The output of line blanking circuit 46 is connected to a vertical sync insertion circuit 48 which receives the vertical sync signal, $f_v$, from sync separator 41.

The horizontal synchronization signal $f_h/2$ from sync separator circuit 41 is connected to the input of a divide-by-2 stage 49 having a pair of complementary outputs Q and Q. The Q output of divider 49 controls switch 50, while the Q output controls switch 45. The clock pulse input to shift register 43 is connected to the contactor of a switch 51, while the clock pulse input to shift register 44 is connected to the contactor of a switch 52.

The $f_h/2$ output of sync separator 41 is also connected to the input of a phase-locked loop oscillator 53 whose output frequency $f_s$ corresponds to the output frequency of divider 29 in FIG. 2. The output of oscillator 53 is connected to one of the input terminals of both switches 51 and 52 and also to divide-by-2 circuit 54 which produces clock output signals having a frequency $f_s/2$. The output of divider circuit 54 is connected to the other input terminals of switches 51 and 52 and to the control terminal of switch 42.

In a manner which is entirely complementary to the operation of the transmitter processing circuitry discussed with reference to FIG. 2, switches 51 and 52, under the control of the complementary outputs, from divider 49, alternately connect the clock input terminal of shift registers 43 and 44 to either clock pulse signal $f_s$ or $f_s/2$. Thus, the shift registers advance the video information stored therein at a rate which is proportional to either the read-in line period or the read-out line period.

The $f_h/2$ output from sync circuit 41 is also connected to one of the two inputs of a logical AND-gate 55, while the other input of AND-gate 55 is connected to the Q output of divide-by-2 circuit 49. The output of AND-gate 55 is connected to a multiplier circuit 47 whose output, at frequency $2 \times f_h/2$, constitutes the line blanking signal.

In operation, switch 42 samples the incoming 263 line video signal at the $f_s/2$ rate. Then switch 45 alternately routes successive sampled lines to either shift register 43 or shift register 44. While a shift register is receiving an incoming line, the corresponding clock lead switch connects the clock input of the register to the signal which is at the clock rate $f_s/2$. At the same time the contactor of switch 50 receives the output of the other shift register, which is, of course, advanced at twice the rate of the first register, i.e., at $f_s$. After the video signals have been compressed, vertical sync insertion circuit 48 re-inserts the recovered vertical synchronization signals in a well known manner.

As shown in FIG. 4, line blanking circuit 46 is inserted between the output of switch 50 and the vertical sync insertion circuit 48. Multiplier circuit 47, in cooperation with AND-gate 55, causes every even numbered line to be blanked in each field. Situating the line blanking circuit before the vertical sync insertion circuit prevents the blanking circuit from distortion and modifying the vertical synchronization signal. The output of vertical sync insertion circuit 48 is, of course, connected to the input of the standard CTV receiver 16 which will display the transmitted picture with standard PVT resolution.

Figure 5:
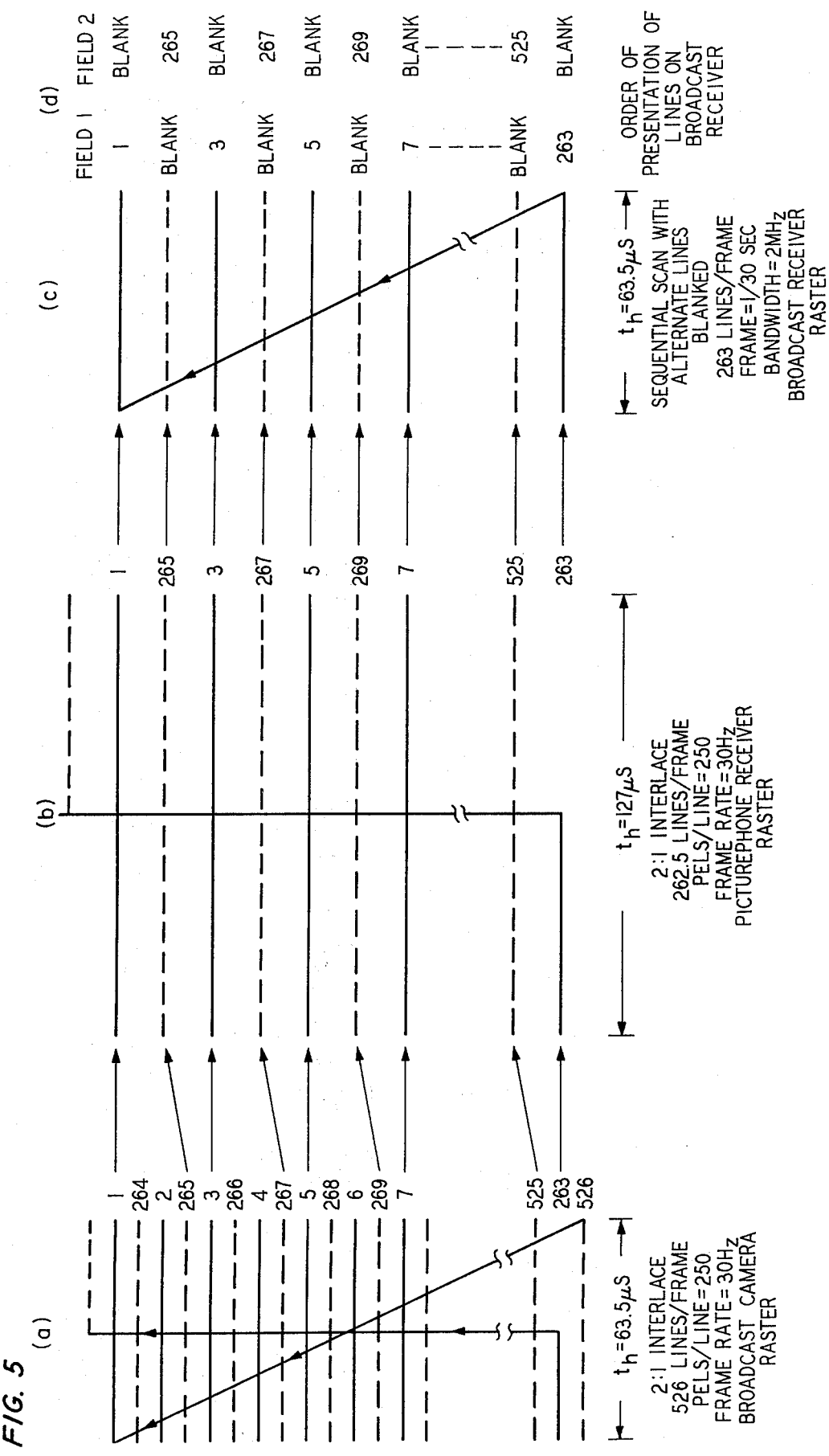
FIG. 5 is a diagram illustrating an algorithm for processing a reduced bandwidth video signal such as produced by the circuitry of FIG. 2, so that it may be displayed on a conventional television receiver.

Turning now to FIG. 5, the operating algorithm for the receiver processing circuit shown in FIG. 4 is explained graphically. FIG. 5(a) shows the original raster prior to time-stretching in apparatus of FIG. 1. FIG. 5(b) shows the same raster after the even-numbered lines have been suppressed and the odd-numbered lines time-stretched. FIG. 5(c) shows the raster after the horizontal sync signals have been compressed from a periodicity of 127 microseconds to 63.5 microseconds. As previously explained, the sequentially scanned raster shown in FIG. 5(c) is obtained by recovering the vertical synchronization signal from the input to the compressor and then reinserting the vertical synchronization signal after the compression process; thus, the vertical synchronization signal is not compressed and will occur at the end of the last scanning line. This produces a sequentially scanned raster at the receiver comprising 263 lines. As shown in FIG. 5(c), the lines of the odd-numbered fields are displayed in a spatially correct manner while the lines of the even-numbered fields are displaced upward by one-half the pitch of a PICTUREPHONE line, with respect to the original raster of FIG, 5(a). As a consequence of switch 50 dwelling for a period of 127 microseconds in both read-out positions, two successive 63.5 microseconds read-out periods are encompassed, one of which contains the desired video information, the other of which contains extraneous and undesired information. The function of line blanking circuit 46 is not only to block the extraneous information coming from shift registers 43 and 44, but also to reduce the visibility of the unmodulated lines in the 263 line display raster.

As shown in FIG. 5(d), in field 1 the even-numbered lines of the raster are blanked and a video signal is displayed on the odd lines of the raster. In field 2, the odd-numbered lines of the raster are blanked and a video signal displayed on the even-numbered lines of the raster. The resulting 263 line raster is subjectively similar to a standard PICTUREPHONE raster, as shown in FIG. 5(b).

As mentioned previously, the above technique does not make full use of the display capabilities inherent in a 525 line television receiver. Accordingly, FIG. 6 depicts yet another embodiment of the invention which may advantageously be used to process the incoming PICTUREPHONE signal so that a 526 line picture will be generated in the receiver.

Figure 6:
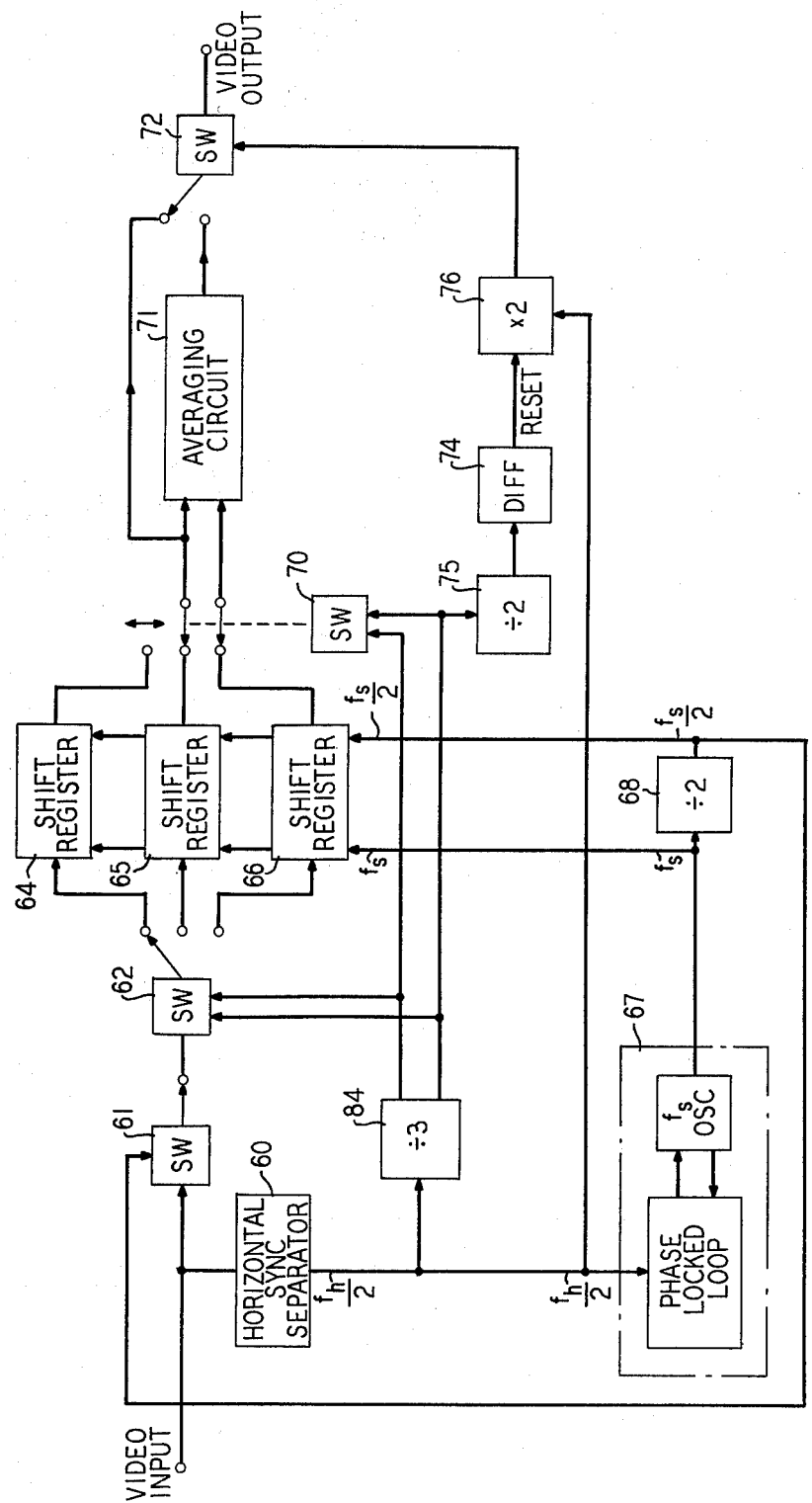
FIG. 6 is a schematic diagram of an illustrative receiver processing circuit for implementing the algorithm shown in FIG. 5.

As shown, the circuit of FIG. 6 differs from the circuit of FIG. 4 in that FIG. 6 contains three circulating shift registers, rather than two non-circulating shift registers, and the vertical synchronizing signal is compressed along with the other signals. A full, 526 line display is generated on the receiver by averaging adjacent transmitted scan lines to simulate the information which was suppressed by the transmitter processing circuit at the transmitting location.

As shown in FIG. 6, the incoming video signal is applied to the input of a horizontal sync separator circuit 60 and to a sampling switch 61, thence to the output of a single-pole, three-position electronic switch 62. Sampling switch 61 provides discrete samples of the incoming video signal for storage in either of three shift registers 64, 65 and 66.

Switch 62 routes the incoming video samples, one line at a time, to either first shift register 64, second shift register 65, or third shift register 66. To simplify the drawing the electronic switches which are connected to the clock pulse inputs of the shift registers have not been shown. However, it will be appreciated by one skilled in the art that it is necessary to provide an electronic clock pulse switch at an appropriate rate for each of the three shift registers. In a manner similar to that discussed with reference to FIg. 4, a phase-locked loop oscillator 67 and a divide-by-2 circuit 68 are used to generate the clock signals $f_s$ and $f_s/2$. The clock pulse switches (not shown in FIG. 6) connect the clock pulse input of each shift register to either the shifting rate signal $f_s$ or the shifting rate signal $f_s/2$, as is appropriate. The outputs of the three shift registers are connected to the terminals of a twopole, three-position electronic switch 70, the operation of which will be discussed in more detail below.

The two contactors of switch 70 are connected to the inputs of an averaging circuit 71, the output of which is connected to one terminal of another electronic switch 72. The other terminal of switch 72 is connected directly to the upper contactor of switch 70 and the output of switch 72 is connected to the standard television receiver 16.

The horizontal sync signal $f_h/2$ from sync separator 60 is applied to one input of a multiply-by-two circuit 76, the square wave output of which is used to control electronic switch 72. The $f_h/2$ signal from sync separator 60 is also connected to a divide-by-3 circuit 84 whose two selected outputs are connected to switches 62 and 70. Switches 62 and 70, commonly referred to in the literature as demultiplexers and multiplexers, respectively, route the lines of video signal in accordance with their binary input.

One of the outputs of divide-by-3 circuit 84 is applied to the input of divide-by-2 circuit 75, the output of which is differentiated in a differentiating circuit 74. The output of the differentiating circuit 74 is applied to the reset input of the multiply-by-two circuit 76 thus synchronizing its phase every sixth $f_h/2$ line and ensuring that switches 62, 70, and 72 operate in correct synchronism.

In operation, switch 62 routes the first line of the incoming video signal to shift register 64 which is advanced via its associated electronic clock pulse switch (not shown) at clock shifting rate $f_s/2$. After the first line has been stored in register 64, switch 62 is moved to route the next incoming line of signals, line 3, to shift register 65. After line 3 has been stored, switch 62 is moved to route the next incoming line of signals, line 5, to shift register 66. All three registers are now full and storing the first three lines of video information. Next, switch 62 returns to the upper position and stores the next line, line 7, in register 64. This process is reiterated until all 263 lines of the frame have been processed, at which point the process is restarted for the next frame.

At the same time that switch 62 is moved to feed line 3 into shift register 65, switch 70 is moved upwardly to position the two moving contacts so that averaging circuit 71 is simultaneously connected to the outputs of shift registers 64 and 65. However, at this time switch 72 is set in its upper position so that it is not connected to the output of averaging circuit 71 but, rather, directly to the output of register 64 via the upper of the two moving contacts of switch 70. Thus, the output from switch 72 will be the contents of shift register 64, which is at this time advanced at a clock rate corresponding to clock shifting rate $f_s$. When switch 62 is moved to route line 5 to shift register 66, switch 72 is moved to the lower position to connect to the output of averaging circuit 71. Since the inputs to averaging circuit 71 comprise line 1 (stored in register 64) and line 3 (stored in register 65) the output of averaging circuit 71 is a scanning line which represents the average of the contents of shift registers 64 and 65, that is line ([1+3]/2).

Figure 7:
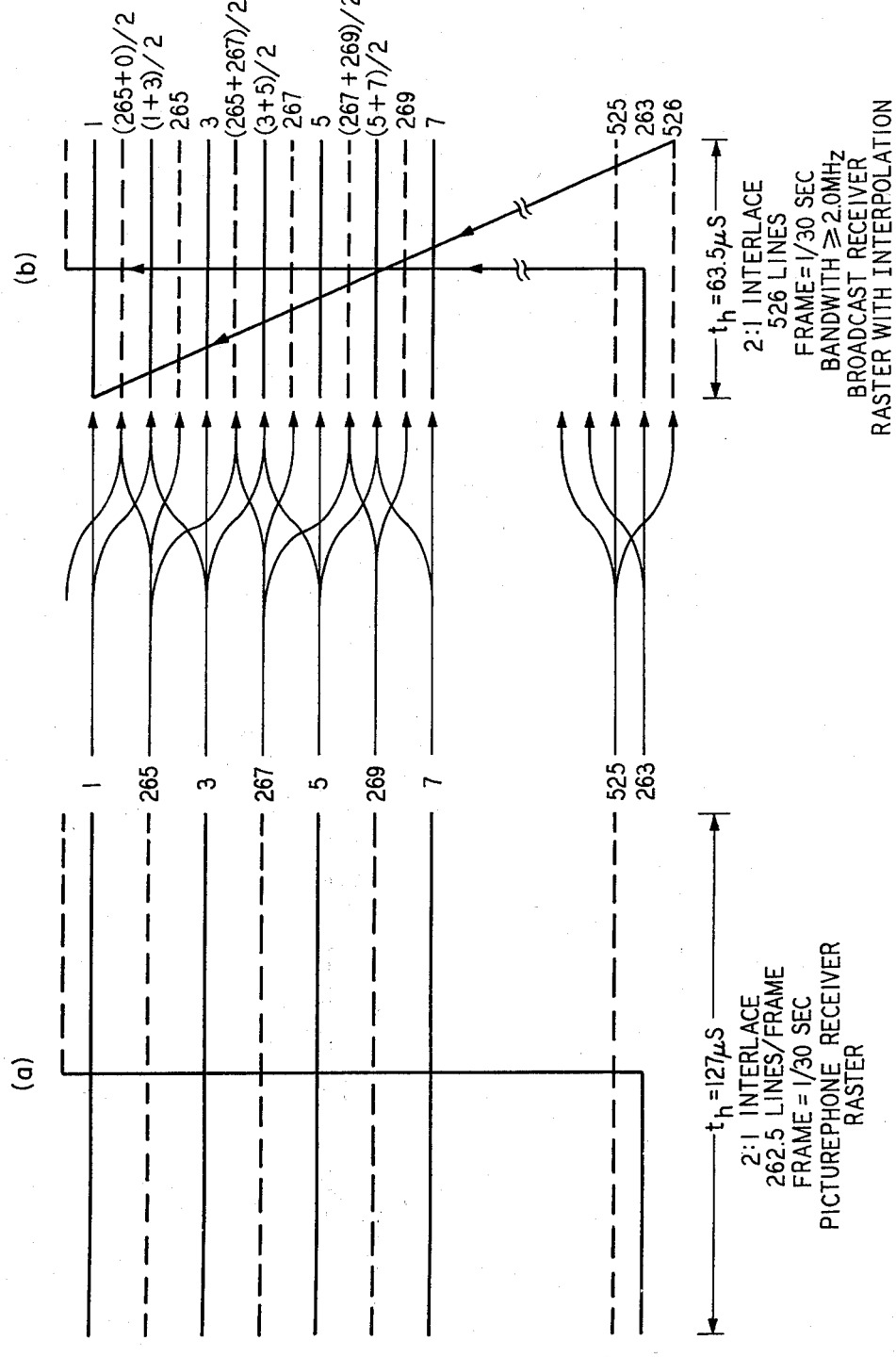
FIG. 7 is a diagram illustrating another algorithm for use with the circuitry of FIG. 6.

Switch 62 is then moved to route the next incoming line, line 7, into shift register 64 which is now empty. At the same time, switch 70 is moved downwardly and switch 72 upwardly, so that the next line which is fed to the output will be line 3, currently stored in shift register 65. While line 7 is being read into shift register 64, switch 72 is moved to the output of averaging circuit 71 so that the next line presented will be the average of the contents of registers 65 and 66, that is line ([3+5]/2). Switch 62 is now moved to route the next incoming line, line 9, to shift register 65. At the same time, the upper contact of switch 70 passes line 5, which is stored in shift register 66. Simultaneously the lower contact of switch 70 is moved to connect to register 64. When switch 72 subsequently moves to the output of averaging circuit 71, lines 5 and 7 will be averaged. Thus as is shown more clearly in FIG. 7(b), the lines which are displayed on the receiver during the first field of the video signal are lines 1, ([1+3]/2), 3, ([3+5]/2), 5, ([5+7]/2), ..., and during the second field, lines 265, ([265+267]/2), 267 ([267+269]/2), 269, ([269+271]/2), ... and so on.

Thus, a 526 line, 2:1 line interlaced raster is created in which the transmitted lines of the odd field are displayed in a spatially correct manner, while the non-transmitted lines are displayed as the average value of the two adjacent transmitted lines. The results for the even field are identical with respect to the camera raster, i.e., all spatial distortions are due to the averaging process in each case.

It should be remembered that the electronic switches shown in the several embodiments of the invention discussed above are diagrammatically simplified in the drawings. Actually, these electronic switches comprise well known configurations of logical AND and OR-gates. Further, the analogue shift registers shown may comprise any of several well known devices; for example, a charge-coupled, or bucket-brigade shift register.

A series of experiments was run on the apparatus shown in FIGS. 1, 2, 4 and 6. These experiments proved that the 263 line display was comparable in resolution and quality to a standard PICTUREPHONE display. When used to display graphical material, diagonal lines were found to display a slight staircase effect on sharp sloping edges. This is due to the spatial displacement of lines in the even fields. Also, tests on alphanumeric displays showed some visible displacement but this was not found to have a significant effect on the readability of the alphanumerics. These defects could be reduced by taking the average value at the transmitted end of the adjacent lines in the even field which abut the missing lines of the odd field. The 526 line display of a human face, using the scanning and averaging format shown in FIG. 7(b), was seen to exhibit streaks on diagonal boundaries due to spatial displacement and overlap introduced by the receiving processor. Some contouring was also noted at horizontal boundaries, for example, on the lips of the human subject. With a live subject who exhibited moderate motion, these defects were not found to be disconcerting. However, the legibility of alphanumerics was slightly impaired as compared to the 263 line picture, FIG. 5(c). On a 14 inch studio monitor, the line structure of the 263 line picture was clearly visible and to some observers the picture appeared to be slightly superior in quality to the 526 line picture.

The embodiments of the invention discussed above are intended to process analogue signals. However, one skilled in the art will appreciate that is possible to digitalize the video signal prior to processing, in which event digital shift registers would be substituted for the analogue device shown.

One skilled in the art may also make various changes to the arrangement of parts shown without departing from the spirit and scope of the invention.

What is claimed is:

1. Apparatus for reducing the bandwidth of the composite video signal generated by a television camera, or the like, said camera supplying in addition to the video signal a horizontal synchronization signal and a master clock signal, which comprises:
   a first divider circuit for dividing the frequency of said horizontal synchronization signal by a factor of two;
   a second divider circuit, connected to the output of said first divider circuit, for dividing the frequency thereof by a factor of two, said second divider circuit having first and second complementary outputs;
   a third divider circuit for dividing the frequency of said master clock signal by a factor of N, where N is inversely proportional to the horizontal definition desired for the reduced bandwidth video signal;
   a fourth divider circuit for dividing the frequency of the output from said third divider circuit by a factor of two;
   first switching means, controlled by the output of said first divider circuit, for interrupting the transmission path of said video signal during alternate scanning lines in each field of said vido signal;
   a first shift register of a capacity sufficient to store at least one complete scanning line of said video signal;
   a second switching means, controlled by the first output of said second divider circuit, for alternately connecting the clock pulse input of said first shift register to the output of said third divider circuit or to the output of said fourth divider circuit;
   a second shift register of a capacity sufficient to store at least one complete scanning line of said video signal;
   third switching means, controlled by the second output of said second divider circuit for alternately connecting the clock pulse input of said second shift register to the output of said fourth divider circuit or to the output of said third divider circuit;
   fourth switching means, connected to the output of said first switching means and controlled by the first output of said second divider circuit, for alternately routing the scanning lines of said video signal which are passed by said first switching means to said first or to said second shift register; and
   fifth switching means controlled by the second output of said divider stage, for alternately selecting the output of said first and said second shift registers thereby to generate a composite video signal of reduced bandwidth.

2. The apparatus according to claim 1 further including:
   first and second, two-input logical AND-gates, one input of each gate being connected to the output of said first divider circuit, the other input of each gate being respectively connected to the first and second output of said second divider circuit; and third and fourth, two-input, logical AND-gates, one input of each gate being connected to the output of said third divider circuit, the other input of each gate being respectively connected to the output of said first and second AND-gates.

3. The apparatus according to claim 1 further comprising a sixth switching means, controlled by the output of said third divider circuit, interposed between the source of said video signal and the input to said first switching means for periodically sampling each line in said composite video signal.

4. The apparatus according to claim 3 further comprising a low-pass filter interposed between the source of said composite video signal and the input to said sixth switching means.

5. Apparatus for modifying a composite video signal of a first bandwidth so that it may be displayed on a video receiver nominally designed to display a composite video signal of a second bandwidth, which comprises:
means for recovering the horizontal and vertical synchronization signals from said composite video signal;
a first divider circuit, connected to said recovering means, for dividing the frequency of said horizontal synchronization signal by a factor of two, said divider having first and second complementary outputs;
a phase-locked loop oscillator, connected to the horizontal synchronization output of said recovering means, for generating a train of sampling pulses having a frequency which is harmonically related to the frequency of said horizontal synchronization signal;
a second divider circuit, connected to the output of said phase-locked loop oscillator, for dividing the frequency of said sampling pulses by a factor of two;
a first shift register of a capacity sufficient to store at least one complete scanning line of said video signal;
first switching means, controlled by the first output of said first divider circuit, for alternately connecting the clock pulse input of said first shift register to the output of said phase-locked loop oscillator or to the output of said second divider circuit;
a second shift register of a capacity sufficient to store at least one complete scanning line of said video signal;
second switching means, controlled by the second output of said divider circuit, for alternately connecting the clock pulse input of said second shift register to the output of said second divider circuit or to the output of said phase-locked loop oscillator;
third switching means, controlled by the second output of said divider circuit, for alternately routing successive scanning lines in said video signal to the input of either said first or said second shift registers;
means, connected to the vertical output of said synchronization recovering means, for reinserting vertical synchronization signals into said video signal; and fourth switching means, controlled by the first output of said first divider circuit, for alternately connecting the output of said first or said second shift register to said synchronization signal insertion circuit, thereby to yield said modified video signal.

6. The apparatus according to claim 5 further including means for blanking alternately scanning lines in each field of said modified video signal.

7. The apparatus according to claim 6 wherein said blanking means comprises a two-input, logical AND-gate having one input connected to the horizontal synchronization output of said synchronization recovering means and the second input connected to the first output of said first divider circuit;
a muliplier circuit, connected to the output of said AND-gate for multiplying the frequency of the logical product of the horizontal synchronization signal and the output of said first divider circuit by a factor of two; and
gating means, responsive to the output of said multiplier circuit and interposed between said fourth switching means and said vertical synchronization reinsertion means, for blanking the alternate lines in each field of said modified video signal.

8. The apparatus according to claim 6 further including a sixth switching means, controlled by the output of said second divider circuit, interposed between the source of said video signal and the input to said third switching means for periodically sampling each line in said video signal.

9. Apparatus for modifying a composite video signal of a first bandwidth so that it may be displayed on a video receiver nominally designed to display a composite video signal of a second bandwidth, which comprises:
means for recovering the horizontal synchronization signals from said composite video signal;
a phase-locked loop oscillator, connected to the output of said horizontal synchronization recovering means, for generating a train of sampling pulses having a frequency which is harmonically related to the frequency of said horizontal synchronization signal;
a first divider circuit connected to the output of said phase-locked loop oscillator for dividing the frequency of said sampling pulse by a factor of two;
a second divider circuit connected to said horizontal synchronization recovering means, for dividing the frequency of the output therefrom by a factor of three, said divider having a direct output and at least one intermediate output;
first, second, and third circulating shift registers each of a capacity sufficient to store at least one complete scanning line of said video signal;
first switching means, controlled by the direct and intermediate outputs of said second divider circuit for cyclically distributing the scanning lines in said video signal among said first, second, and third shift registers;
means, controlled by the direct and intermediate outputs of said second divider circuit, for cyclically connecting the clock pulse inputs of said first, second, and third shift registers to either the output of said phase-locked loop oscillator circuit or to the output of said first divider circuit;
an averaging circuit having first and second inputs and an output, the signal on said output representing the mean of the signals applied to said fist and second inputs;

second switching means, controlled by the direct and intermediate output of said recovering means, for cyclically permuting the first and second inputs of said averaging circuit among the outputs of said first, second and third shift registers;

a third divider circuit connected to an output of said second divider circuit for dividing the frequency of the output therefrom by a factor of two;

a differentiating circuit connected to the output of said third divider circuit for differentiating the output pulses therefrom;

a multiplier circuit connected to said synchronization recovering means for multiplying the frequency of the output therefrom by a factor of two, the output of said differentiating circuit being connected to the reset input of said multiplier; and third switching means, controlled by the output of said multiplying circuit, for alternately connecting either the first input or the output of said averaging circuit to said receiver, whereby the input to said receiver comprises the 1st, ([1+3]/2)rd, 3rd, ([3+5]/2)th, 5th, . . . lines during odd fields of said video signal, and the 265th, ([265+267]/2)th, 267th, ([267+269]/2)th, 269th, . . . lines during even fields of said video signal.

* * * * *